(12) United States Patent
Kim et al.

(10) Patent No.: US 10,526,207 B2
(45) Date of Patent: Jan. 7, 2020

(54) METHOD OF PREPARING METAL OXIDE-SILICA COMPOSITE AEROGEL AND METAL OXIDE-SILICA COMPOSITE AEROGEL PREPARED BY USING THE SAME

(71) Applicant: LG CHEM, LTD., Seoul (KR)

(72) Inventors: Jong Hun Kim, Daejeon (KR); Jae Hoon Choi, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 128 days.

(21) Appl. No.: 15/577,742

(22) PCT Filed: Jun. 1, 2016

(86) PCT No.: PCT/KR2016/005815
§ 371 (c)(1),
(2) Date: Nov. 28, 2017

(87) PCT Pub. No.: WO2016/195380
PCT Pub. Date: Dec. 8, 2016

(65) Prior Publication Data
US 2018/0127277 A1   May 10, 2018

(30) Foreign Application Priority Data

Jun. 1, 2015  (KR) .................. 10-2015-0077280
Jun. 1, 2016  (KR) .................. 10-2016-0067867

(51) Int. Cl.
| | | |
|---|---|---|
| C01B 33/158 | (2006.01) | |
| C01B 13/18 | (2006.01) | |
| C01B 13/36 | (2006.01) | |
| B01J 13/00 | (2006.01) | |
| B01J 19/12 | (2006.01) | |
| C01F 5/30 | (2006.01) | |
| C01F 11/24 | (2006.01) | |

(52) U.S. Cl.
CPC ....... *C01B 33/1585* (2013.01); *B01J 13/0091* (2013.01); *B01J 19/12* (2013.01); *C01B 13/185* (2013.01); *C01B 13/363* (2013.01); *C01F 5/30* (2013.01); *C01F 11/24* (2013.01); *C01P 2006/11* (2013.01); *C01P 2006/12* (2013.01)

(58) Field of Classification Search
CPC . C01B 33/1585; C01B 13/185; C01B 13/363; B01J 13/0091; B01J 19/12
See application file for complete search history.

(56) References Cited

U.S. PATENT DOCUMENTS

| | | | |
|---|---|---|---|
| 2,241,791 A | 5/1941 | Rembert | |
| 2,434,418 A | 1/1948 | La Lande, Jr. | |
| 3,473,890 A | 10/1969 | Reinhardt et al. | |
| 3,977,993 A * | 8/1976 | Lynch | B01J 13/0091 423/338 |
| 4,367,292 A * | 1/1983 | Sano | C04B 35/195 423/328.2 |
| 5,811,031 A * | 9/1998 | Jansen | B01J 13/0091 423/338 |
| 5,851,947 A | 12/1998 | Hair et al. | |
| 5,948,482 A | 9/1999 | Brinker et al. | |
| 6,315,971 B1 | 11/2001 | Wallace et al. | |
| 2009/0317619 A1 | 12/2009 | Di Monte et al. | |
| 2011/0000370 A1 * | 1/2011 | Norberg | B01D 53/508 95/90 |
| 2013/0106008 A1 * | 5/2013 | Ahn | C01B 33/1585 264/5 |
| 2015/0225630 A1 | 8/2015 | Hosoi et al. | |
| 2018/0127277 A1 | 5/2018 | Kim et al. | |
| 2018/0127278 A1 | 5/2018 | Kim et al. | |
| 2018/0127279 A1 | 5/2018 | Kim et al. | |

FOREIGN PATENT DOCUMENTS

| | | |
|---|---|---|
| EP | 3305725 | 4/2018 |
| EP | 3305726 | 4/2018 |
| EP | 3305727 | 4/2018 |
| JP | H0264007 | 3/1990 |
| JP | H11139819 | 5/1999 |
| JP | 2000034117 | 2/2000 |
| JP | 2012172378 | 9/2012 |
| JP | 2014051643 | 3/2014 |
| KR | 10-0785521 | 12/2007 |
| KR | 10-2009-0115714 | 11/2009 |
| KR | 10-2010-0065692 | 6/2010 |

(Continued)

OTHER PUBLICATIONS

Extended Search Report of European Patent Office in Appl'n No. 16803735.6, dated Apr. 25, 2018.
Extended Search Report of European Patent Office in Appl'n No. 16803734.9, dated May 4, 2018.
Extended Search Report of European Patent Office in Appl'n No. 16803736.4, dated May 9, 2018.
Office Action of the Korean Patent Office in Appl'n No. 10-2016-0067870, dated May 11, 2018.
Giesche, "Mercury Porosimetry: A General (Practical) Overview," Part. Part. Syst. Charact. 23: 9-19 (2006).

(Continued)

*Primary Examiner* — Anthony J Zimmer
*Assistant Examiner* — Ricardo D Morales
(74) *Attorney, Agent, or Firm* — Dentons US LLP

(57) ABSTRACT

Provided are a method of preparing a metal oxide-silica composite aerogel, which includes preparing metal oxide-silica composite precipitates by adding a metal salt solution to a silicate solution and performing a reaction, and drying the metal oxide-silica composite precipitates by irradiation with infrared rays in a wavelength range of 2 μm to 8 μm, and a metal oxide-silica composite aerogel having excellent physical properties, such as low tap density and high specific surface area, as well as excellent pore properties prepared by the method.

16 Claims, No Drawings

(56) References Cited

FOREIGN PATENT DOCUMENTS

| | | |
|---|---|---|
| KR | 10-2010-065692 | 6/2010 |
| KR | 10-2010-0090989 | 8/2010 |
| KR | 10-2010-090989 | 8/2010 |
| KR | 10-2011-0046715 | 5/2011 |
| KR | 10-1323303 | 10/2013 |
| KR | 10-2014-0005177 | 1/2014 |
| KR | 10-2014-0076022 | 6/2014 |
| KR | 10-2014-0146814 | 12/2014 |
| WO | 1998045032 | 10/1998 |
| WO | 2013118940 | 8/2013 |

OTHER PUBLICATIONS

Office Action of European Patent Office in Appl'n No. 16803734.9 dated May 20, 2019.

\* cited by examiner

METHOD OF PREPARING METAL OXIDE-SILICA COMPOSITE AEROGEL AND METAL OXIDE-SILICA COMPOSITE AEROGEL PREPARED BY USING THE SAME

CROSS-REFERENCE TO RELATED APPLICATIONS

This application is a National Stage Application of International Application No. PCT/KR2016/005815 filed on Jun. 1, 2016, which claims priority to and the benefit of Korean Patent Application Nos. 2015-0077280, filed on Jun. 1, 2015, and 2016-0067867, filed on Jun. 1, 2016, all of which are incorporated herein in their entirety by reference for all purposes as if fully set forth herein.

TECHNICAL FIELD

The present invention relates to a method of preparing a metal oxide-silica composite aerogel having low tap density and high specific surface area as well as excellent pore properties by minimizing a shrinkage phenomenon occurring in a drying process during the preparation of the metal oxide-silica composite aerogel, and a metal oxide-silica composite aerogel prepared by using the same.

BACKGROUND ART

Recently, interests in an aerogel having excellent heat insulation properties have grown as industrial technologies are modernized. Aerogels developed to date may include an organic aerogel, such as resorcinol-formaldehyde or melamine-formaldehyde aerogel particles, and an inorganic aerogel including metal oxide such as a silica ($SiO_2$), ($Al_2O_3$), titania ($TiO_2$), or carbon (C) aerogel.

Among these aerogels, the silica aerogel is a highly porous material, wherein, since the silica aerogel may exhibit an excellent heat insulation effect by having high porosity and specific surface area as well as low thermal conductivity, applications in various areas, such as heat insulation materials, catalysts, sound-absorbing materials, fillers, and interlayer dielectric materials of a semiconductor circuit, are expected.

Since the silica aerogel has low mechanical strength due to its porous structure, the silica aerogel is normally commercialized in a form, such as an aerogel blanket or aerogel sheet, by compositing with a base material such as glass fibers, ceramic fibers, or polymer fibers. However, since the silica aerogel structurally contains 90 vol % or more of air in an internal pore, the silica aerogel has limitations in that scattering is severe during processing due to excessively low density and it is difficult to impregnate the silica aerogel into the base material. Also, since the silica aerogel is not mixed well due to an excessively large difference in density with respect to the base material even if a portion of the silica aerogel is impregnated, limitations, such as appearance defects and physical property deterioration, may occur. Furthermore, the silica aerogel must be mixed in a volume fraction of 50 vol % or more to achieve the heat insulation effect due to filling by efficiently blocking heat transfer, but it is not easy to process the powder itself at such a high mixing ratio.

Accordingly, in order to improve the properties of the aerogel, such as heat insulation, sound absorption, and catalytic activity, as well as processability of the silica aerogel or provide additionally required properties, a method of mixing an additive with the aerogel has been proposed. Specifically, a method of strengthening a structure and increasing density by introducing elements heavier than silicon (Si), such as titanium (Ti) and iron (Fe), into a silica aerogel skeleton by a method of adding the additive to a sol before polymerization of the silica aerogel or contacting the prepared silica aerogel with a liquid or vapor stream containing the additive, or a method of forming a composite with an inorganic material having a plate structure has been proposed.

However, convention methods have limitations in that control of size and particle size distribution of the additive materials is not easy, and deformation and reduction of the pore structure occur during the preparation of the silica aerogel.

DISCLOSURE OF THE INVENTION

Technical Problem

An aspect of the present invention provides a preparation method which may easily prepare a metal oxide-silica composite aerogel having low tap density and high specific surface area as well as excellent pore properties by minimizing a shrinkage phenomenon of a silica gel which occurs in a drying process during the preparation of the metal oxide-silica composite aerogel.

Another aspect of the present invention provides a metal oxide-silica composite aerogel prepared by the above preparation method.

Technical Solution

According to an aspect of the present invention, there is provided a method of preparing a metal oxide-silica composite aerogel including: preparing metal oxide-silica composite precipitates by adding a metal salt solution to a silicate solution and performing a reaction; and drying the metal oxide-silica composite precipitates by irradiation with infrared rays in a wavelength range of 2 μm to 8 μm.

According to another aspect of the present invention, there is provided a metal oxide-silica composite aerogel prepared by the method.

Advantageous Effects

A method of preparing a metal oxide-silica composite aerogel according to the present invention may minimize a shrinkage phenomenon of an aerogel, which occurs in a drying process, by allowing drying of the inside of pores of the aerogel and drying of a particle surface to be performed at the same time during drying of metal oxide-silica composite precipitates. As a result, a metal oxide-silica composite aerogel having excellent physical properties, such as low tap density and high specific surface area, as well as excellent pore properties may be prepared. Accordingly, the metal oxide-silica composite aerogel prepared by the above preparation method may be used in various industrial areas, for example, catalysts or heat insulation materials, due to the above-described pore and physical properties.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A drying process for particles of a composite aerogel during the preparation of the typical metal oxide-silica composite aerogel is usually performed in a drying oven. Since drying is performed at an ambient temperature in the oven in the drying process, a solvent present in pores of the silica gel particles diffuses into a surface and then evaporates from the surface. In this case, since a shrinkage phenomenon of the pores is amplified due to capillarity caused by surface tension of the solvent, tap density of the aerogel is increased, specific surface area and porosity are reduced, and, as a result, thermal conductivity is increased.

In contrast, in the present invention, in order to allow drying of the inside of the pores of the silica gel particles and drying of the particle surface to be performed at the same time, a drying process is performed by irradiation with middle range infrared rays (MIR) corresponding to a wavelength range in which the infrared rays may resonate with water used as a solvent or a hydroxy group, and thus, shrinkage of the aerogel particles may be minimized and a rapid drying effect due to MIR absorption may be obtained for a metal oxide. As a result, a metal oxide-silica composite aerogel having improved tap density, specific surface area, and pore properties may be prepared.

That is, a method of preparing a metal oxide-silica composite aerogel (hereinafter, simply referred to as 'composite aerogel') according to an embodiment of the present invention includes the steps of: preparing metal oxide-silica composite precipitates by adding a metal salt solution and, selectively, an acid catalyst to a silicate solution and performing a reaction (step 1); and drying the metal oxide-silica composite precipitates by irradiation with infrared rays in a wavelength range of 2 µm to 8 µm (step 2). Hereinafter, each step will be described in more detail.

Step 1

In the method of preparing a composite aerogel according to the embodiment of the present invention, step 1 is a step of forming metal oxide-silica composite precipitates by adding a metal salt solution and, selectively, an acid catalyst to a silicate solution and performing a reaction.

The silicate solution may be prepared by dissolving water glass ($Na_2SiO_3$) in a solvent, particularly water, at a concentration of 0.125 M to 3.0 M. If the concentration of the water glass is less than 0.125 M, an amount of silica in the finally prepared composite aerogel is low, and, if the concentration of the water glass is greater than 3.0 M, the tap density of the composite aerogel may be increased due to the excessive formation of the composite aerogel. In consideration of a tap density reduction effect, the silicate solution may particularly include the water glass at a concentration of 0.75 M to 3.0 M and may more particularly include the water glass at a concentration of 1.5 M to 2.0 M. In this case, the water glass is not particularly limited, but the water glass may contain silica ($SiO_2$) in an amount of 28 wt % to 35 wt %, for example, 28 wt % to 30 wt %, based on a total weight of the water glass.

Also, the silicate solution may include the water glass ($Na_2SiO_3$) in an amount such that 0.04 M to 6.0 M of silica is included based on the silica ($SiO_2$) included in the water glass.

Furthermore, the metal salt solution is prepared by dissolving a metal salt, as a raw material to allow a metal oxide to be formed in the finally prepared composite aerogel, in a solvent. The metal salt may specifically be a salt including at least one metal selected from the group consisting of alkali metals, alkaline earth metals, lanthanides, actinides, transition metals, and Group 13 (IIIA) metals, and, for example, may be chloride including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W). Also, among the above-described metals, the metal may be appropriately selected depending on the application of the composite aerogel, for example, the metal salt may be chloride including magnesium, calcium, or a mixed metal thereof in consideration of using the composite aerogel in applications requiring thermal insulation.

Also, in a case in which the metal salt includes two kinds of metal salts, it is desirable to add the two kinds of metal salts by adjusting a ratio of concentrations of each metal ion so as to satisfy a ratio of metallic elements in a metal oxide in the finally prepared composite aerogel. For example, with respect to a composite aerogel required to have an excellent thermal insulation performance, the composite aerogel may include MgO and CaO as the metal oxide, and, in this case, the MgO and the CaO may be included at a molar ratio of 1:2 to 2:1.

Furthermore, the metal salt may be used in an amount such that a concentration of metal ions derived from the metal salt in the metal salt solution is in a range of 0.125 M to 3.0 M. If the concentration of the metal ions is less than 0.125 M, since an amount of the metal oxide formed in the composite aerogel is small, an improvement effect due to the formation of the metal oxide is insignificant, and, if the concentration of the metal ions is greater than 3.0 M, physical properties including tap density of the composite aerogel may be deteriorated due to the formation of an excessive amount of the metal oxide. Specifically, the metal salt may be used in an amount such that the concentration of the metal ions in the metal salt solution is in a range of 0.25 M to 1.0 M, for example, 0.25 M to 0.5 M.

Furthermore, comparing with the concentration of the water glass in the silicate solution within the above-described concentration range, the metal salt may be used in an amount such that a molar ratio of water glass:metal ions is in a range of 1:1 to 3:1. If the concentration of the metal salt is outside the above molar ratio range, the tap density of the finally prepared composite aerogel may be increased. Specifically, the metal salt may be used in an amount such that the molar ratio of water glass:metal ions is in a range of 1.5:1 to 3:1, for example, 3:1.

Also, the solvent used for the formation of the metal salt solution may be used without particular limitation as long as it may dissolve the above-described metal salt. Specifically, the solvent may include water or a hydrophilic polar organic solvent, and any one thereof or a mixture of two or more thereof may be used. Among these, since the hydrophilic polar organic solvent has excellent miscibility with the above-described silicate solution, the hydrophilic polar organic solvent may be uniformly present in a gel during the subsequent gelation.

The hydrophilic polar organic solvent may specifically be an alcohol-based solvent. Also, the alcohol-based solvent may specifically be a monovalent alcohol such as methanol, ethanol, isopropanol, and butanol; or a polyvalent alcohol such as glycerol, ethylene glycol, propylene glycol, diethylene glycol, dipropylene glycol, and sorbitol, and any one thereof or a mixture of two or more thereof may be used. Among these alcohols, the alcohol-based solvent may be an alcohol having 1 to 8 carbon atoms in consideration of miscibility with water and uniform dispersibility in the silica gel. Also, in consideration of the efficiency of the subsequent modification reaction on the surface of the silica in addition to the above-described effect, the alcohol-based solvent may be a linear alcohol having 1 to 4 carbon atoms, such as methanol, ethanol, propanol, or n-butanol, and one alone or a mixture of two or more thereof may be used. For example, the alcohol-based solvent may be methanol, ethanol, or a mixture thereof.

After mixing the silicate solution with the metal salt solution, the method may further include a step of adjusting a pH of a mixture obtained as a result of the mixing process to be in a range of 1.5 to 10, for example, 3 to 9.5. In this case, if the pH of the mixture is outside the above range, the tap density of the finally prepared composite aerogel may be increased and the specific surface area and pore properties may be reduced.

The pH of the mixture may be adjusted by controlling the mixing ratio of the silicate to the metal salt, or may be controlled by selectively further adding an acid catalyst.

The acid catalyst plays a role in increasing a formation rate of the composite precipitates by promoting the reaction of the silicate solution with the metal salt solution during the formation of the composite precipitates. The acid catalyst may specifically include hydrochloric acid, acetic acid, citric acid, sulfuric acid, phosphoric acid, or nitric acid, and any one thereof or a mixture of two or more thereof may be used. Among these acids, the acid catalyst may be an inorganic acid such as hydrochloric acid.

In order to achieve an improvement effect having good balance of the tap density and the specific surface area and pore properties due to the pH adjustment, the pH of the mixture may be adjusted to be in a range of 3 to 9 by the addition of the acid catalyst, and, in consideration of a significant improvement effect, the pH of the mixture may be adjusted to be in a range of 3 to 8, for example, 5 or more to less than 7.5.

When the silicate solution, the metal salt solution, and the acid catalyst are mixed and reacted, metal oxide-silica precipitates are formed and precipitated. For example, in a case in which $MgCl_2$ and $CaCl_2$ are used as the metal salt, $MgO$—$CaO$—$SiO_2$ composite precipitates are precipitated by a reaction of the following Reaction Formula 1.

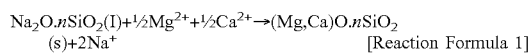
[Reaction Formula 1]

After the formation of the metal oxide-silica precipitates, a separation process, in which the precipitates are separated from the solvent by a typical method, for example, using a vacuum filter, may be selectively further performed. In this case, the method of preparing a composite aerogel according to the embodiment of the present invention may further include the separation process from the solvent, after the formation of the metal oxide-silica composite precipitates.

Before performing a drying process after the formation and/or separation of the metal oxide-silica composite precipitates, a washing process for removing unreacted reactants (e.g., $Si^{4+}$, $Mg^{2+}$, or $Ca^{2+}$) and added ions ($Na^+$ or $Cl^-$) remaining in the precipitates may be selectively further performed. In this case, the method of preparing a composite aerogel according to the embodiment of the present invention may further include the washing process after the formation of the metal oxide-silica composite precipitates.

The washing process may be performed by a typical method, such as immersion, spray, or injection, using a washing solvent. Specifically, the washing solvent may include water; an alcohol-based compound such as methanol, ethanol, isopropanol, or propanol; a hydrocarbon-based compound such as hexane, octane, n-decane, n-heptane, n-undodecane, cyclohexane, or toluene; or a ketone-based compound such as methylethylketone or acetone, and any one thereof or a mixture of two or more thereof may be used. Among these compounds, the alcohol-based compound, in which it has excellent miscibility with water as the reaction solvent, it easily penetrates into the pores in the silica gel particles, it has a drying effect when combined with the subsequent drying process, and resulting shrinkage and deformation of the pores may hardly occur, for example, ethanol may be used.

The washing process may be repeated once or twice or more, specifically, 3 to 5 times. Also, in a case in which the washing process is repeated twice or more, the washing process may be performed by using the same washing solvent or may be performed by using different kinds of washing solvents.

Also, before the subsequent drying process and after the separation of the metal oxide-silica composite precipitates or the washing process, a water content control process through solid/liquid separation may be performed.

The water content control process may be performed by a typical solid/liquid separation method, for example, using a vacuum filter, and may specifically be performed so that a water content in the metal oxide-silica composite precipitates is 110 wt % or less, for example, 85 wt % or less based on a total weight of the metal oxide-silica composite precipitates. Drying time during the drying process may be reduced and processability may be simultaneously increased through the control of the water content.

Step 2

In the method of preparing a composite aerogel according to the embodiment of the present invention, step 2 is a step of drying the metal oxide-silica composite precipitates formed in step 1 to prepare a composite aerogel.

The drying process may be performed by using infrared rays in a wavelength range of 2 μm to 8 μm. The wavelength within the above range penetrates into the silica aerogel particles to resonate with water used as the solvent or a hydroxy group (—OH) in a solvent molecule in a wavelength range of 2 μm to 8 μm. As a result, energy is directly applied to the solvent present in the silica aerogel particles to allow drying to occur in the aerogel and, simultaneously, to allow drying to be also performed on a surface of the aerogel particles by an increase in ambient temperature, and thus, shrinkage of the pores in the aerogel particles may be minimized. Specifically, infrared rays in a wavelength range of 2 μm to 4 μm, or infrared radiation with an average main peak wavelength of 2 μm to 4 μm may be used.

Also, the ambient temperature at which the drying process is performed may be easily controlled by adjusting an intensity during infrared irradiation in the above-described wavelength range. Specifically, the infrared irradiation may be performed at an intensity such that the ambient temperature becomes in a range of 130° C. to 300° C. during the infrared irradiation. Accordingly, in the drying process, drying may be fully completed by the infrared irradiation. In consideration of a significant improvement effect according to the intensity adjustment during the infrared irradiation, the infrared irradiation may be performed at an intensity such that the ambient temperature becomes in a range of 190° C. to 300° C. or 220° C. to 300° C. during the infrared irradiation. Furthermore, 80% or more, particularly, 80% to 95% of a primary drying process is performed by infrared irradiation, and drying of the remaining portion, i.e., a secondary drying process, may then be performed at an ambient temperature increased with the infrared intensity during the infrared irradiation.

The above-described infrared irradiation may be performed by using an apparatus equipped with an infrared lamp capable of generating infrared rays in the above-described wavelength range. Specifically, after the metal oxide-silica composite precipitates to be dried are disposed on a substrate, the infrared irradiation may be performed by irradiating the precipitates with infrared rays by controlling the wavelength and intensity of the infrared lamp. In this case, a venting device may be selectively further provided so that drying efficiency is not reduced due to an excessively increased concentration of the solvent evaporated in the apparatus.

Furthermore, the method of preparing a metal oxide-silica composite aerogel according to the embodiment of the present invention may be performed by combining and optimizing conditions of the washing solvent during the washing process and drying conditions during the drying process for a good balanced improvement of the tap density and Brunauer-Emmett-Teller (BET) specific surface area of the finally prepared metal oxide-silica composite aerogel. Specifically, the method of preparing a metal oxide-silica composite aerogel includes the steps of: preparing metal oxide-silica composite precipitates by adding a metal salt solution and an acid catalyst to a silicate solution and performing a reaction; and, after washing the metal oxide-silica composite precipitates with a washing solvent of an alcohol-based compound, drying the metal oxide-silica composite precipitates by irradiation with infrared rays in a wavelength range, in which the infrared rays may resonate with a water molecule or hydroxy group in a solvent used during preparation of the silicate solution and the metal salt solution, at an intensity such that an ambient temperature becomes in a range of 130° C. to 300° C., particularly 190° C. to 300° C., and more particularly 220° C. to 300° C. In this case, types and amounts of the materials used in each step and specific process conditions are the same as described above.

Since a shrinkage phenomenon of the silica gel, which occurs during the drying process, may be minimized by the above-described preparation process, a metal oxide-silica composite aerogel having excellent physical properties, such as low tap density and high specific surface area and porosity, may be prepared.

Thus, according to another embodiment of the present invention, a metal oxide-silica composite aerogel prepared by the above-described preparation method is provided.

The metal oxide-silica composite aerogel is a composite in which the silica aerogel and the metal oxide are mixed in a composite aerogel structure, wherein it has low tap density, high specific surface area, and low thermal conductivity by controlling conditions during the preparation process.

Specifically, the metal oxide-silica composite aerogel has a tap density of 0.2 g/ml or less, particularly 0.055 g/ml or less, and more particularly 0.009 g/ml to 0.055 g/ml. In this case, the tap density of the metal oxide-silica composite aerogel may be measured using a tap density tester (TAP-2S, Logan Instruments Co.).

Also, in addition to the above-described tap density, the metal oxide-silica composite aerogel may have a BET specific surface area of 400 m$^2$/g or more, particularly 450 m$^2$/g or more, and more particularly 450 m$^2$/g to 600 m$^2$/g. In the present invention, the specific surface area of the metal oxide-silica composite aerogel may be measured based on the amounts of nitrogen, which are adsorbed and desorbed according to partial pressure ($0.11 < p/p_o < 1$), using a Micromeritics ASAP 2010 analyzer.

Furthermore, the metal oxide-silica composite aerogel may have an average particle diameter ($D_{50}$) of 7 μm to 15 μm, for example, 7 μm to 12 μm. In the present invention, the average particle diameter ($D_{50}$) of the metal oxide-silica composite aerogel may be defined as a particle diameter at 50% in a cumulative particle diameter distribution. In this case, the average particle diameter of the metal oxide-silica composite aerogel may be measured by using a laser diffraction method, or the average particle diameter ($D_{50}$) at 50% in a cumulative particle diameter distribution of the measurement instrument may be calculated by using a particle size measurement instrument (Macrotrac Particle Size Analyzer S3500) as a dry analysis model.

Also, within the above-described ranges of the tap density, specific surface area, and particle diameter, low thermal conductivity and improved heat insulation effect may be obtained due to a volume occupied by the pores. Specifically, the metal oxide-silica composite aerogel may have a thermal conductivity of 30 mW/mK or less. In this case, the thermal conductivity may be measured at 25° C. using a thermal conductivity meter (HFM436 Lambda, NETZSCH).

Furthermore, the metal oxide-silica composite aerogel has excellent pore properties by the characteristic drying process during the preparation process. Specifically, the metal oxide-silica composite aerogel may have a porosity of 80 vol % or more, or 90 vol % to 98 vol %, and may include micropores having an average pore diameter of 20 nm or less, or 5 nm to 15 nm. In this case, the average pore diameter and the porosity of the metal oxide-silica composite aerogel may be measured based on the amounts of nitrogen, which are adsorbed and desorbed according to partial pressure ($0.11 < p/p_o < 1$), using a Micromeritics ASAP 2010 analyzer.

Also, the metal oxide-silica composite aerogel may have a pore volume of 0.4 cm$^3$/g to 1.0 cm$^3$/g, for example, 0.4 cm$^3$/g to 0.7 cm$^3$/g. In this case, the pore volume of the metal oxide-silica composite aerogel may be determined from an amount of mercury intruded into pores which is measured by mercury porosimetry analysis.

In the metal oxide-silica composite aerogel, the silica aerogel has a porous particulate structure including a plurality of micropores, wherein it may include a microstructure, in which nano-sized primary particles, particularly, primary particles having an average particle diameter ($D_{50}$) of 100 nm or less, or 1 nm to 50 nm, are combined to form a cluster in the form of a mesh, i.e., a three-dimensional network structure.

Furthermore, since the metal oxide is immobilized by a silanol group present on a surface of the silica aerogel, it is describable to appropriately control density of the silanol group present on the surface of the silica aerogel in order to increase an immobilization efficiency between a negative charge of the surface of the silica aerogel and a positive charge of the metal oxide. Specifically, the density of the silanol group present on the surface of the silica aerogel may be $10/nm^2$ or less, or $5/nm^2$ to $7/nm^2$.

Accordingly, the silica aerogel may have a Brunauer-Emmett-Teller (BET) specific surface area of 50 $m^2/g$ to 700 $m^2/g$, an average particle diameter ($D_{50}$) of 10 µm to 150 µm, a porosity of 0.5 $cm^3/g$ to 2.4 $cm^3/g$, and an average pore diameter of the pores included in the silica aerogel of 0.5 nm to 40 nm. In a case in which the BET specific surface area, average particle diameter, porosity, or average pore diameter is outside the above range, for example, the average pore diameter is less than 0.5 nm, since the density of the silanol group is relatively increased, an absolute value of the negative charge is increased, and, as a result, the immobilization efficiency with respect to the positively charged metal oxide is increased, but hydrophilicity is also increased to reduce dispersibility of the metal oxide-silica composite aerogel. Also, in a case in which the average pore diameter is greater than 40 nm, since the density of the silanol group is relatively decreased, there is no concern that the dispersibility of the metal oxide-silica composite aerogel is reduced, but the immobilization efficiency may be reduced due to the low absolute value of the negative charge.

In the metal oxide-silica composite aerogel, the metal oxide may be used without particular limitation as long as it is used to form the composite aerogel by being immobilized by the silanol group on the surface of the silica aerogel. Specifically, the metal oxide may be an oxide including at least one metal selected from the group consisting of alkali metals, alkaline earth metals, lanthanides, actinides, transition metals, and Group 13 (IIIA) metals, may particularly be an oxide including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W), and may more particularly be magnesium oxide, calcium oxide, or a mixture thereof.

The metal oxide is discontinuously physically immobilized on the surface of the silica by electrical attraction between the relatively positively charged metal oxide and the negative charge due to the silanol group present on the surface of the silica. Accordingly, in order for the metal oxide to be immobilized on the surface of the silica aerogel easily and with excellent efficiency and simultaneously exhibit a sufficient effect, the metal oxide may have appropriate particle diameter and specific surface area. Specifically, the metal oxide may have a specific surface area of 20 $m^2/g$ to 100 $m^2/g$ and an average particle diameter ($D_{50}$) of 5 nm to 300 nm.

Also, an amount of the metal oxide included in the composite aerogel may be adjusted depending on the application of the metal oxide-silica composite aerogel, but, specifically, the metal oxide may be included in an amount of 5 wt % to 80 wt % based on a total weight of the composite aerogel. Furthermore, the metal oxide may be included in an amount such that a molar ratio (molar ratio of Si/Me) of silicon (Si) included in the metal oxide-silica composite aerogel to metal (Me) included in the metal oxide is 1:1 to 3:1, particularly 1.5:1 to 3:1, and more particularly 3:1.

Specifically, according to another embodiment of the present invention, a metal oxide-silica composite aerogel having an average particle diameter ($D_{50}$) of 7 µm to 15 µm, for example, 7 µm to 12 µm, a tap density of 0.055 g/ml or less, for example, 0.009 g/ml to 0.055 g/ml, and a BET specific surface area of 450 $m^2/g$ or more, for example, 450 $m^2/g$ to 600 $m^2/g$, which includes a porous particulate silica aerogel including a plurality of micropores and a metal oxide dispersed in the porous silica aerogel, is provided by a preparation process configured by optimally combining the types of the washing solvent and the drying process conditions during the preparation process.

As described above, since the metal oxide-silica composite aerogel prepared by the preparation method according to the present invention has excellent physical properties such as low tap density and high specific surface area, the metal oxide-silica composite aerogel is suitable for a catalyst, or heat insulation materials, lagging materials, or non-flammable materials of aircrafts, ships, automobiles, and building structures as well as plant facilities for insulation such as an industrial furnace or pipes of various industrial equipment.

Hereinafter, the present invention will be described in more detail, according to the following examples and experimental example. However, the following examples and experimental example are merely presented to exemplify the present invention, and the scope of the present invention is not limited thereto.

Example 1

Distilled water was added and mixed with water glass ($Na_2SiO_3$) to prepare a silicate solution having a $Na_2SiO_3$ concentration of 1.5 M. Separately, $MgCl_2$ and $CaCl_2$ were dissolved in distilled water to prepare a metal salt solution (total concentration of metal ions=0.5 M, molar ratio of $Mg^{2+}:Ca^{2+}=1:1$), and the metal salt solution was then added and mixed with the silicate solution. An HCl acid catalyst was added to the resulting mixture until a pH of the mixture became 7.3. White precipitates were generated immediately when a reaction of the silicate solution with the metal salt solution occurred.

After natural precipitation of the precipitates, a transparent solvent on an upper layer was separated and removed. The separated precipitates were repeatedly washed three times with ethanol and then vacuum filtered. A resulting cake (water content of about 85 wt %) was disposed on a substrate of a MIR drying apparatus equipped with a MIR lamp and dried by MIR irradiation under conditions listed in the following Table 1 to prepare a metal oxide-silica composite aerogel which includes porous particulate silica including a plurality of micropores and a metal oxide dispersed in the porous silica. In this case, an amount of each compound was used as described in the following Table 1.

Examples 2 and 3

Metal oxide-silica composite aerogels were prepared in the same manner as in Example 1 except that washing and drying processes were performed under conditions described in the following Table 1.

Comparative Examples 1 to 8

Metal oxide-silica composite aerogels were prepared in the same manner as in Example 1 except that washing and drying processes were performed under conditions described in the following Table 1.

Experimental Example

Tap densities and average particle diameters of the metal oxide-silica composite aerogels prepared in Examples 1 to 3 and Comparative Examples 1 to 8 according to drying methods were respectively evaluated.

In this case, the tap density was measured using a tap density tester (TAP-2S, Logan Instruments Co.). The results thereof are presented in Table 1 below.

Also, after a particle diameter was measured three times using a particle size measurement instrument (Macrotrac Particle Size Analyzer S3500) as a dry analysis model, an average particle diameter ($D_{50}$) was expressed as an average value.

respectively used as a reaction solvent and a washing solvent in a wavelength range of 2 μm to 4 μm, and, simultaneously, drying of the surface of the gel particles was performed due to an increase in ambient temperature caused by the MIR lamp. Accordingly, it may be understood that the tap density of the finally prepared composite aerogel may be reduced and the specific surface area may be significantly increased during drying by the MIR irradiation.

Also, Examples 1 to 3, in which MIR irradiation with a wavelength range of 2 μm to 8 μm was performed, had

TABLE 1

| | Washing solvent | Drying method | Drying condition | Wavelength range (μm) | Main peak wavelength range | Average main peak wavelength (μm) | Ambient temperature (° C.) | Tap density (g/ml) | Average particle diameter ($D_{50}$, μm) |
|---|---|---|---|---|---|---|---|---|---|
| Example 1 | Ethanol | MIR irradiation | IR 90% | 2~8 | 2~4 | 3 | 190 | 0.051 | 8.5 |
| Example 2 | Mixed liquid of water and ethanol (mixing weight ratio = 60:40) | MIR irradiation | IR 90% | 2~8 | 2~4 | 3 | 190 | 0.054 | 8.8 |
| Example 3 | Ethanol | MIR irradiation | IR 100% | 2~8 | 2~4 | 3 | 220 | 0.045 | 7.8 |
| Comparative Example 1 | Ethanol | Oven drying | — | — | — | — | 105 | 0.084 | 10.5 |
| Comparative Example 2 | Mixed liquid of water and ethanol (mixing weight ratio = 60:40) | Oven drying | — | — | — | — | 105 | 0.110 | 12.1 |
| Comparative Example 3 | Ethanol | Oven drying | — | — | — | — | 150 | 0.080 | 9.4 |
| Comparative Example 4 | Ethanol | Oven drying | — | — | — | — | 190 | 0.078 | 8.9 |
| Comparative Example 5 | Ethanol | NIR irradiation | IR 90% | 0.75~2 | 0.8~1.5 | 1.15 | 95 | 0.071 | 9.7 |
| Comparative Example 6 | Ethanol | NIR irradiation | IR 100% | 0.75~2 | 0.8~1.5 | 1.15 | 110 | 0.067 | 8.6 |
| Comparative Example 7 | Ethanol | FIR irradiation | IR 90% | 9~15 | 9~15 | 12 | 125 | 0.073 | 9.3 |
| Comparative Example 8 | Ethanol | FIR irradiation | IR 100% | 9~15 | 9~15 | 12 | 140 | 0.063 | 8.7 |

The expression 'IR 90%' of the drying condition in Table 1 denotes that drying is performed by adjusting an intensity of an infrared irradiation apparatus to be 90%, and, as a result, a drying temperature at IR 90% is lower than that at IR 100%.

As illustrated in Table 1, the composite aerogels of Examples 1 to 3, in which solvent evaporation was allowed to simultaneously occur in the silica gel particles and on the surface thereof by the MIR irradiation, had reduced tap densities in comparison to Comparative Examples 1 to 4 which were dried using a drying oven. Specifically, with respect to Example 3, the tap density was reduced by 46.4% in comparison to Comparative Example 1, 59.1% in comparison to Comparative Example 2, 43.8% in comparison to Comparative Example 3, and 42.3% in comparison to Comparative Example 4.

These results were obtained due to the fact that the shrinkage phenomenon of the aerogel particles during the drying process was minimized in comparison to conventional oven drying because drying of the solvent in the pores of the gel structure may be performed by directly applying energy by allowing a MIR wavelength to penetrate into an aerogel structure to resonate with hydroxy groups (—OH) included in molecular structures of the water and the ethanol significantly reduced tap densities in comparison to Comparative Examples 5 to 8 in which the same washing solvent was used and irradiation of far infrared rays (FIR) or near infrared rays (NIR) in a different wavelength range was performed under the same drying condition of IR 90% or IR 100%. From these results, it may be understood that the tap density of the finally prepared composite aerogel may be significantly improved only by the control of the wavelength of the infrared rays during the drying.

Furthermore, Example 1, in which the single ethanol solvent was used as the washing solvent, had a greater tap density reduction effect than Example 2 in which the mixture solvent of water and ethanol was used as the washing solvent under the same condition of IR 90%. From these results, it may be understood that the tap density of the metal oxide-silica composite aerogel may be further reduced by the simultaneous control of the washing solvent as well as the drying process by the infrared irradiation.

Also, for the metal oxide-silica composite aerogels prepared in Example 1 and Comparative Example 1, amounts of nitrogen, which were adsorbed and desorbed according to partial pressure ($0.11 < p/p_o < 1$), were additionally measured using a Micromeritics ASAP 2010 analyzer, and BET specific surface areas of the composite aerogels were evaluated therefrom.

TABLE 2

| | BET specific surface area of composite aerogel (m²/g) |
|---|---|
| Example 1 | 540 |
| Comparative Example 1 | 400 |

As a result, Example 1, in which the drying process was performed by the MIR irradiation, had a BET specific surface area which was increased by about 25.9% or more in comparison to that of Comparative Example 1 in which the oven drying process was performed. From these results, it may be understood that the specific surface area as well as the tap density of the finally prepared composite aerogel may be significantly improved during drying by the infrared irradiation.

The invention claimed is:

1. A method of preparing a metal oxide-silica composite aerogel, the method comprising:
    preparing metal oxide-silica composite precipitates by adding a metal salt solution to a silicate solution and performing a reaction; and
    drying the metal oxide-silica composite precipitates by irradiation with infrared rays having a wavelength in a range of 2 μm to 8 μm in an apparatus equipped with a middle range infrared ray (MIR) lamp that generates the infrared rays at an intensity such that a temperature within the apparatus is in a range of 130–300° C.

2. The method of claim 1, wherein the drying is performed by irradiation with infrared rays in a wavelength range in which the infrared rays resonate with a water molecule or a hydroxy group in a solvent used during preparation of the silicate solution and the metal salt solution.

3. The method of claim 1, wherein the drying is performed by irradiation with infrared rays in a wavelength range of 2 μm to 4 μm.

4. The method of claim 1, further comprising performing an additional drying process at a temperature in a range of 130° C. to 300° C., after the drying by the infrared irradiation.

5. The method of claim 1, wherein the silicate solution is prepared by dissolving water glass at a concentration of 0.125 M to 3.0 M.

6. The method of claim 1, wherein the metal salt solution has a metal ion concentration of 0.125 M to 3.0 M.

7. The method of claim 1, wherein the metal salt comprises chloride including at least one metal selected from the group consisting of alkali metals, alkaline earth metals, lanthanides, actinides, transition metals, and Group 13 (IIIA) metals.

8. The method of claim 1, wherein the metal salt comprises one selected from the group consisting of $MgCl_2$ and $CaCl_2$, or a mixture thereof.

9. The method of claim 1, wherein the metal salt comprises $MgCl_2$ and $CaCl_2$) in amounts such that a molar ratio of magnesium ions to calcium ions is in a range of 1:2 to 2:1.

10. The method of claim 1, wherein the reaction of the silicate solution with the metal salt solution is performed in a pH range of 3 to 9.5.

11. The method of claim 1, wherein the reaction is performed in a pH range of 5 or more to less than 7.5 by further adding an acid catalyst during the reaction of the silicate solution with the metal salt solution.

12. The method of claim 11, wherein the acid catalyst is hydrochloric acid.

13. The method of claim 1, further comprising washing the metal oxide-silica composite precipitates using a washing solvent before the drying,
    wherein the washing solvent comprises one selected from the group consisting of water, an alcohol-based compound, a hydrocarbon-based compound, and a ketone-based compound, or a mixture of two or more thereof.

14. The method of claim 13, wherein the washing solvent comprises the alcohol-based compound.

15. A metal oxide-silica composite aerogel prepared by the method of claim 1.

16. The metal oxide-silica composite aerogel of claim 15, wherein the metal oxide-silica composite aerogel has an average particle diameter ($D_{50}$) of 7 μm to 15 μm, a tap density of 0.055 g/ml or less, and a Brunauer-Emmett-Teller (BET) specific surface area of 450 m²/g or more.

* * * * *